(12) United States Patent
Araya et al.

(10) Patent No.: US 9,239,710 B2
(45) Date of Patent: Jan. 19, 2016

(54) PROGRAMMING LANGUAGE TRANSFORMATIONS WITH ABSTRACT SYNTAX TREE EXTENSIONS

(71) Applicant: ArtinSoft Corporation, Bellevue, WA (US)

(72) Inventors: Carlos Araya, Saratoga, CA (US); Iván Sanabria, Cartago (CR); Federico Zoufaly, San Jose (CR)

(73) Assignee: ArtinSoft Corporation, Bellevue, WA (US)

( * ) Notice: Subject to any disclaimer, the term of this patent is extended or adjusted under 35 U.S.C. 154(b) by 305 days.

(21) Appl. No.: 13/841,892

(22) Filed: Mar. 15, 2013

(65) Prior Publication Data

US 2014/0282444 A1    Sep. 18, 2014

(51) Int. Cl.
  *G06F 9/45* (2006.01)
(52) U.S. Cl.
  CPC ........................... *G06F 8/42* (2013.01)
(58) Field of Classification Search
  USPC .......................................................... 717/143
  See application file for complete search history.

(56) References Cited

U.S. PATENT DOCUMENTS

| | | | |
|---|---|---|---|
| 5,970,490 A * | 10/1999 | Morgenstern | |
| 2001/0037492 A1* | 11/2001 | Holzmann | 717/4 |
| 2004/0098732 A1* | 5/2004 | Clement et al. | 719/328 |
| 2004/0194072 A1* | 9/2004 | Venter | 717/140 |
| 2009/0319981 A1* | 12/2009 | Akkiraju et al. | 717/104 |
| 2011/0271260 A1* | 11/2011 | Kwon et al. | 717/138 |

* cited by examiner

*Primary Examiner* — Hang Pan

(57) ABSTRACT

Techniques to automate the transformation of an application involving programming language constructs from a composite of source grammars to a composite of target grammars, while maintaining the fidelity of the program semantics and functionality, or extending or changing it to explode the capabilities and avoid the limitations of new technologies are disclosed. The different stages of the transformation are persisted in an annotated abstract syntax tree where the annotations represent semantic preserving transformation rules. The abstract syntax tree is then transformed according to the transformational rules. The transformed abstract syntax tree may then be traversed to generate a new translated source code application or be queried to generate output reports. Alternatively, the transformed abstract syntax tree may be subjected to another transformation as part of a chain of transformations.

24 Claims, 4 Drawing Sheets

PROGRAMMING LANGUAGE TRANSFORMATIONS WITH ABSTRACT SYNTAX TREE EXTENSIONS

BACKGROUND

Computer programs are written in one or more computer programming languages. A computer program originates from one or more source code files written in the one or more programming languages. The source code files are subsequently interpreted by a runtime or execution environment, or compiled into object code and linked into a binary executable.

A programming language is defined by a grammar which sets forth the syntactic rules governing that programming language. The grammar will comprise a set of grammar elements which include a set of primitive symbols and a set of rules on what constitute valid combinations of the symbols into higher level. For example, the primitive symbols may comprise American Standard Code for Information Interchange ("ASCII") characters, which may be combined into terms, and where terms may then be combined with additional characters and other terms into expressions. Grammars are often formally represented with Backus-Naur Form ("BNF").

While a grammar defines the syntax of a programming language, a program comprises a set of semantic statements, expressed in one or more expressions in the syntax of the programming language. A set of expressions in the syntax of the programming language that corresponds to a semantic statement in the source code of a program is called a source code construct. Accordingly, a source code of program contains one more source code constructs, which ultimately will instruct a processor on how to execute according to the semantics of the program.

It is laborious to create a computer program. Production of a commercial computer program, may take years to develop. Examples include the Windows™ operating system where various releases have taken four years with thousands of developers to complete. In addition to writing the source code, the program must also be verified to operate according to the semantics expected by the designers and by customers. Thus a computer program represents a non-trivial investment by developers and customers alike.

However, as a computer program is maintained, over time it may be desirable to change one or more of the underlying programming languages used in the program. For example, new versions of the underlying programming languages may occur over time. For example, the FORTRAN programming language according to the FORTRAN 77 standard is different from the FORTRAN 90 standard. By way of another example, Visual Basic 7™ which is based on the .NET™ framework, is not fully backwards compatible with Visual Basic 6™ which is based on the Common Object Model ("COM") framework.

Changes to one or more of the underlying programming languages used in the program may also be motivated by the need to port a program to different platforms. For example, a mobile application targeting the Android™ operating system is typically written in the Java™ programming language. However, if that mobile application is to be ported to Apple's iOS™ operating system, then that mobile application might potentially be rewritten in the Objective C programming language.

A platform change need not be from one device to another, but may be to a different target topology altogether. For example, an application initially written for a client-server, two-tier, Local Area Network ("LAN") environment might be ported to a mobile device/application server/database three tier cloud environment. By way of another example, an application originally written for a single core, single processor environment might be ported to a different programming language as part of a refactoring effort to target symmetric multi-processor ("SMP") environments, or massively multi-core processors. There are cases where a program originally written in a structural programming language, such as the C programming language, is ported to a functional programming language, such as Erlang to better handle parallelism.

Present porting efforts, such as described above, as well as for more general refactoring are typically done manually, thus duplicating the cost of initial development and validation. Accordingly, there is an opportunity to fully automate porting while guaranteeing fidelity by transforming programming language constructs.

BRIEF DESCRIPTION OF THE DRAWINGS

The Detailed Description is set forth with reference to the accompanying figures. In the figures, the left-most digit(s) of a reference use of the same reference numbers in different figures indicates similar or identical items.

DETAILED DESCRIPTION

Overview of Programming Language Transformations

Figure 1:
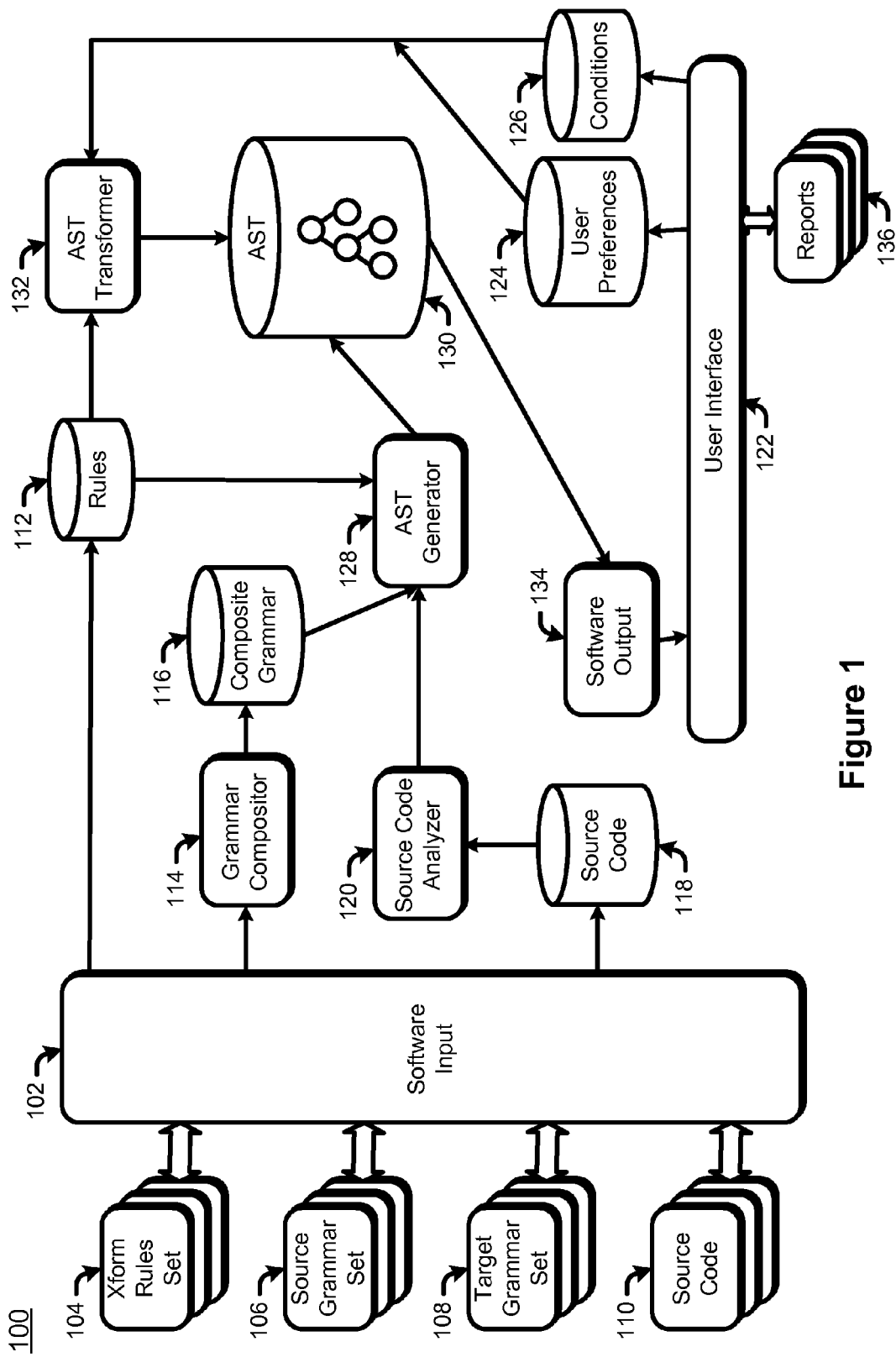
FIG. 1 is a top level context diagram for programming language transformations with abstract syntax tree extensions.

This disclosure describes programming language transformations with abstract syntax tree extensions. An abstract syntax tree is a tree that represents higher level grammatical expressions in source code, as opposed to including all low level grammatical elements such as primitives. In this way, an abstract syntax tree may focus on a more general perspective of a computer program, such as semantic analysis of the computer program, with different purposes, such as validating, transforming or extending it. The abstract syntax tree may then be extended with annotations. As will be described below, the annotations will depend on the desired transformations to be effected.

The transformations disclosed herein are not to be limited to translating a monolithic application from one programming language to another single programming language, although certainly this scenario is enabled. The following describes several examples.

The transformation may be a porting transformation, where semantic fidelity is enforced by the rule. Specifically, execution of the transformed source code should behave identically to execution of the original source code. The transformation may be a non-grammatical transformation where transformation changes the behavior of the execution of the transformed source code in desirable ways independent of grammar, such as such as an optimizing transformation.

A transformation may ensure binary compatibility across a transformation. For example, if code for a COM control is ported from Visual Basic 6™ to C++, the resulting executable should be a COM control that conforms to the binary layout format as specified by the COM standard. Otherwise, the ported COM control will not interoperate with COM clients.

A transformation may minimize execution time of the source code when compiled. Specifically, the transformed program should run more quickly than the previous program without semantic changes.

A transformation may minimize the memory footprint of the source code when compiled. Specifically, the transformed program should take less memory than the previous program without semantic changes.

A transformation may enforce security best practices. Here there is a semantic change, but a desired one. For example, string operations using the Standard C Library may be replaced with a secure string library that removes open ended strings thereby eliminating the threat of buffer overrun attacks. Note that other semantic change transformations need not be security based. For example, string operations using the Standard C Library may be replaced with an international string library, such as one that supports Unicode rather than byte sized characters.

A transformation may take into account data collected from profiling the executable of the untransformed source code such as for power draw. Specifically, there are software constructs that minimize power intensive operations thereby minimizing power draw. A transformation may minimize power draw, and thereby lengthen the operation of a mobile device hosting an application built from transformed source code.

A transformation may port original source code to a new topology. For example, a monolithic application may result in a single executable. However, if the application is to target a multi-tier cloud topology, then a transformation may automatically select code defining user interface, other code defining business logic, and yet other code defining persistence resulting in three executables.

A transformation may port original source code to a massively multi-core topology. For example, an application may originally be a single threaded application. A post-transformation application may identify candidate portions of source code suitable for parallel operation, and refactor the source code to make use of multi-threading where the threads may be dispatched to various cores.

What is apparent from the above, is that techniques and annotations to automate and support transformations including, but not limited to, transformations across grammar cardinalities and transformational rule cardinalities will greatly aid porting, refactoring, and any number of code transformation scenarios. Specifically, this disclosure includes transformations from a single grammar to multiple grammars, and multiple grammars to a single grammar. This disclosure also includes transformations where there may be more than one valid option for transformation, and accordingly provision is made to specify which transformation is to be selected based on user input or on a predetermined condition.

This disclosure also includes transformations that guaranteeing semantic equivalence as well as transformations that evolve functionality. Functional equivalence is based on a programming language construct and its transformed analogue performing the same computation with the same results. Thus an extreme form of functional equivalence may include syntactic equivalence. Alternatively, where a transformation preserves a construct's results, but the transformed construct does not perform the computation in the same way, the transformation may be considered to be functionally equivalent. Semantic equivalence may be considered an abstraction of functional equivalence, where the semantic meaning of a construct is preserved across a transformation. Here transformational rules may be selected where semantic equivalence is either preserved or maximized.

Transformation rules may include expanding or restricting the functionality to adapt it to changing conditions including, but not limited to, changes to newer technology, re-organizations, and changes in business model. Therefore, the transformation for applications, for example in the enterprise space, may be motivated by both technical and business reasons. Whenever any one of these conditions occur, a selected application, be it single module, or an entire system may be automatically ported and or evolved using these automated transformations.

Furthermore transformations may be chained. Specifically, a user may determine that a series of transformations should be applied to an abstract syntax tree generated from source code. The user will specify a series of intermediate grammars starting with an initial grammar and ending with a final grammar. The initial grammar will be used as come a first source code grammar which is then transformed to a target grammar. The target grammar is then used as a source grammar for another transformation into yet another target grammar Ultimately, the chaining terminates with the final grammar. In order to preserve semantics, each intermediate grammar ideally is syntactically sufficient to support a transformation to the next intermediate grammar in the chain. Specifically, the target grammar ideally would have either functionally equivalent syntactic features with the final grammar where semantics match on a per grammatical element basis, or the target grammar ideally would have well defined functional equivalences on a source code construct basis, where a source code construct in the original source grammar is semantically equivalent from an end user's perspective to the source code construct in the target grammar. For an example of the former, both the C and Visual Basic programming languages support a conditional multi-branch feature, where in C the "switch" keyword is used, and in Basic the "select" keyword is used. For an example of the latter, the Lisp programming language introduces keywords specific to lists such as "cons" and "cdr." However the C++ programming language does not contain equivalents. Accordingly, a port from Lisp to C++ might include a source code block in C to implement a list data structure in an object with "cons" and "cdr" methods.

Chaining could also be supplemented by forking the AST. Consider the scenario where an annotation process is triggered over an intermediate AST in the transformation process. The annotations could be incorporated over a new version of the AST and transformations could be applied to the new separate AST. Alternatively the transformations could be encapsulated in a totally distinct grammar with the purpose of using it in a future deduction process that may or may not influence the transformation towards the target grammar. By way of example of the latter, sometimes the transformation is done with the purpose of extracting information, like meaningful content extraction from HTML into XML; or the extraction of an application ontology representing it in XML or other AST grammar for the purpose of performing code separation by component.

Moreover, some transformations support non-grammatical transformations including optimizing transformations and transformations targeting different architectures. The following is an enumeration of some examples.

A transformation may target one or more tiers of a distributed system. By way of some examples, a monolithic application may be converted to a client server, a three-tier enterprise application, or a cloud application with a mobile client and a web service back end as in a service-oriented architecture.

Targeted platforms need not be restricted to software targets. Hardware configurations may be targeted as well. Hardware configurations may be defined on a device basis, such as a mobile device targeting a cloud back end. Hardware configurations may also target particular processors such as a system on a chip or alternatively a particular multi-core processors. Targeting hardware configurations give rise to hardware specific transformations in particular of optimizations. For example, a single core processor cannot perform parallel processing as a 16-core processor might.

Transformations may encompass both software and hardware target configurations. For example, cloud architectures lend themselves to map-reduce and other parallel processing techniques. While map-reduce need not be implemented on the cloud, and indeed may be targeted strictly as a software configuration, it provides an example of targeted both hardware and software configurations at the same time.

Transformations need not be in terms of software or hardware. Transformations include transformations driven by a business or enterprise. For example, transformations may be to ensure compliance with a standard or compliance with business policies. An example business policy may be in how software security is enforced in code.

The above enumeration is not intended to limit the present disclosure. Rather, transformations contemplated include any transformation that may be deterministically expressed. Thus a collection of refactorings, even a larger number of refactorings, many of which are disparate, may be encompassed in a transformation. Transformations may include a specified ontological change or an injection of missing attributes. Transformations include optimizations for processor performance, memory footprint, and any measurable benchmarks that may be deterministically articulated. For example, if generated code quality may be defined in terms of deterministic rules, then in this sense a transformation targeting a specified code quality is encompassed. In this way, technicians may include new rules to incrementally increase generated code quality and/or the level of automation during code generation.

Context of Programming Language Transformations with Abstract Syntax Tree Extensions FIG. 1 is an exemplary context diagram 100 for programming language transformations with abstract syntax tree extensions. It is to be noted that while FIG. 1 illustrates various data storages, the data storages may be in the same physical storage such as a local hard drive or might be distributed in a platform such as an array of servers or a cloud.

Initially, a software input module 102 may receive a rules set 104 comprising one or more transformational rules. Each of the transformational rules in the rules set 104 will prescribe the transformation of a source code construct from one grammar to another. As stated above, the transformational rules may be grammatical in nature, or non-grammatical in nature. Software input module 102 may receive a source grammar set 106 comprising one or more source grammars and a target grammar set 108 comprising one or more target grammars. Source grammar set 106 or target grammar set 108 may include an intermediate grammar as described with respect to FIG. 3 below. Software input module 102 may also receive source code 110 comprising one or more files. Files in source code 110 may be in one or more programming languages. Different programming languages need not be segregated by source code file, but may be inlined. Source code files need not be text files, but may be binary files such as in some implementations of SmallTalk. Also contemplated is that object code or executable code might be used for input, rather than source code. Software input module 102 may then load rules set 104 into rules datastore 112.

Source grammar set 106 and target grammar set 108 may be loaded into a grammar compositor which would combine the at least some of the constituent grammars of the source grammar set 106 and the target grammar set 108 into a composite grammar stored in composite grammar storage 116. The composite grammar would comprise both features of the source grammar set 106 and the target grammar set 108 in a unified way; therefore composite grammar is a super grammar. While not all source grammars 106 need be supported, the composite grammar ideally would support the syntactic features in source code 110, and the syntactic features to support the transformations in rules set 104. In other words, the composite grammar would include enough of the target grammar or grammars to be syntactically sufficient to support the transformations in rules set 104.

Source code 110 may be stored by software input module 102 in source code data storage 118. Upon storage, source code analyzer 120 may analyze the source code to determine the structures that would comprise an abstract syntax tree. The analysis may be static in nature such as a direct parsing of the source code. Since the abstract syntax tree may omit primitives and other lower level constructs, a full parser need not be utilized. Furthermore, some transformations are not grammatical in nature and may seek non-grammatical constructs such as non-secure code, non-internationalized code, and single threaded code. However the analysis may include dynamic analysis. For example, the source code analyzer 120 operates a profile operation to execute the source code 110. Alternatively, profile information from a previous execution of the source code 110 might be input separately and used in concert with static analysis.

Software input module 102 focuses on receiving inputs for a particular instance of a transformation. However, transformations may be based also on factors that apply across multiple transformations. Those factors may be input via transformation engineer interface 122. User interface 122 receives input from a user to store user preferences in user storage 124 and rule conditions in conditions storage 126. As previously stated, rules may be applied accordingly to conditions. For example, a transformation to optimize for memory footprint may be applied if the projected memory footprint after applying a previous transform exceeds a predetermined threshold. The predetermined threshold and the condition may be stored as a condition in conditions storage 126. A rule or a condition may be overridden by a user preference. For example, a user may simultaneously enter the aforementioned memory footprint rule, but also store a user preference to always run the memory footprint rule (or alternatively to always ignore the memory footprint rule). By way of another example, a user preference may apply to conditions, such as temporarily ignoring the memory footprint condition specifying the predetermined threshold.

An abstract syntax tree generator may take input from the rules 112, the composite grammar 116, and the source code analyzer 120 and will generates an abstract syntax tree for storage in abstract syntax tree storage 130. The abstract syntax tree generation may start with reviewing the analysis of the source code analyzer 120 to generate an initial abstract syntax tree in view of the composite grammar 116. Therefore the abstract syntax three is actually an abstract representation of code comprised of different grammars. A second pass may generate annotations based on rules as stored in rules storage 112. It is to be noted that despite the appellation "abstract syntax tree", the abstract syntax tree may not necessarily be stored as a tree. For example, annotations for rules may be stored in a lookup table in tandem with the abstract syntax tree. Alternatively, each node in the abstract syntax tree may store a structure, or pointer to an external structure, to store rules data. In this way, the abstract syntax tree is extended.

When the abstract syntax tree and annotations are stored in abstract syntax tree storage 130, the abstract syntax tree may be transformed by abstract syntax tree transformer 132. Although the abstract syntax tree extensions may store annotations specific to the rules stored in rules storage 112, the abstract syntax tree transformer 132 may also refer to the original rules stored in rules storage 112. Furthermore, since some rules may be conditioned by user preferences or rules conditions, abstract syntax tree transformer 132 is also communicatively connected to user preferences storage 124 and conditions storage 126. Accordingly, abstract syntax tree transformer 132 may traverse the abstract syntax tree in storage 130 and according to the annotations as it traverses the nodes, and subject to user preferences 124 and conditions 126 apply the transformations.

As the transformation rules are closed over the composite grammar, and the transformation preserves the equivalence of the functionality or evolves it, the new transformed AST code is functionally equivalent to the previous AST or it is an evolution of it, containing some of its pieces in a different subset of the composite grammar, and might be having a different semantic. For example, the code now might have some subsets in a mobile device language AST representation, other could be now a new web service built using SOA concepts, that encompasses pieces some pieces of the original functionality, and other could be now in a store procedural language AST representation.

Upon transformation, the abstract syntax tree as stored in 130 may be either queried or traversed by software output module 134. A traversal may simply output the contents of the abstract syntax tree. A query provides a user defined reporting capability and/or ad hoc reporting capability. Upon performing a query or a traversal, software output module 134 generates one or more reports 136 exposed via the user interface 122. Queries may be performed in batch or may be interactive via user interface 122.

A typical example of a report is to generate source code in the target grammar. In this case, the abstract syntax tree is traversed and corresponding source code is generated. Alternatively, the abstract syntax tree as stored in 130 may be queried for example to determine the number of instances that a particular transformation was made. Other reports such as "pretty printing" where the contents of the abstract syntax tree are presented in user readable form may be performed by the software output module 134. For example the pretty printing may be a text file formatted with indentations, bolding and underlining to indicate the structure of the transformed abstract syntax tree. By way of another example, the pretty printing may be the generation of a graphical representation of a tree data structure indicating the contents of the transformed abstract syntax tree. Such pretty printing reports may be used as part of debugging or otherwise evaluating the transformation.

Output of the software output module 134 need not be in the form of text files. For example, generated report 136 may be in the form of binaries or the form of an export to a database file. Specifically, queries directly on an abstract syntax tree may not be efficient. Therefore, particularly large abstract syntax trees may be converted to a relational database format, and exported for future import into an optimized relations database management system.

Exemplary Hardware Platform

Figure 2:
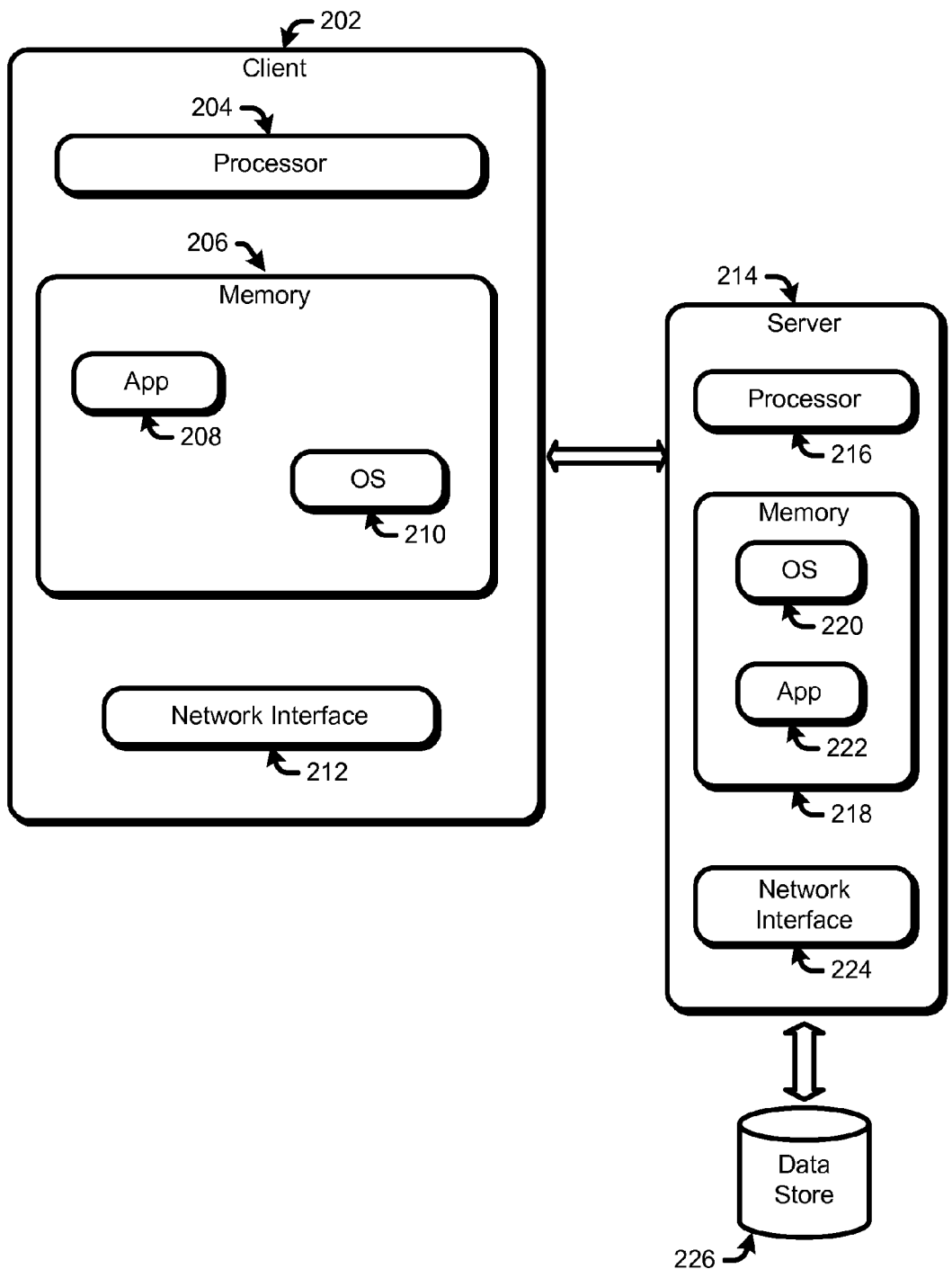
FIG. 2 is a hardware diagram of an exemplary hardware and software platform for programming language transformations with abstract syntax tree extensions.

FIG. 2 illustrates one possible embodiment of a hardware environment 200 for programming language transformations with abstract syntax tree extensions.

Client device 202 is any computing device. A client device 202 may have a processor 204 and a memory 206. Client device 202's memory 206 is any computer-readable media which may store several programs including an application 208 and/or an operating system 210.

Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media.

To participate in a communications environment, user equipment device 202 may have a network interface 212. The network interface 212 may be one or more network interfaces including Ethernet, Wi-Fi, or any number of other physical and data link standard interfaces. In the case where the programming language transformations are to be done on a single machine, the network interface 212 is optional.

User equipment 202 may communicate to a server 214. Server 214 is any computing device that may participate in a network. Server 214 has a processor 216 and memory 218. As per the preceding discussion regarding client device 202, memory 218 is any computer-readable media including both computer storage media and communication media.

In particular, memory 218 stores software which may include an operating system 220 and/or an application 222. Memory 218 may also store applications 222 that may include a database management system. Accordingly, server 214 may include data storage 226. Data storage 226 may be configured as a relational database, an object-oriented database, and/or a columnar database, or any configuration to support policy storage.

It is to be noted that the larger a corpus of source code is, the more benefit is to be realized via automation. Correspondingly, the larger a corpus of source code is, the more likely multiple machines may be used to accommodate processing. For example, a very large abstract syntax tree might be stored on cloud storage where specific portions of the tree are surfaced according to rules. Alternatively, since traversal of abstract syntax tree might be prohibitively slow if performed sequentially, this hardware and software 200 environment contemplates parallel processing. For example, in a prefix traversal of the abstract syntax tree, branches may be processed in parallel across multiple servers or processors, and the final resulting elements might reduced to search for new patterns that could be mapped by a further collection of processors using a map-reduce architecture. Accordingly, although a generic client-server relationship is illustrated in 200, cloud and parallel processing embodiments are contemplated herein.

Figure 3:
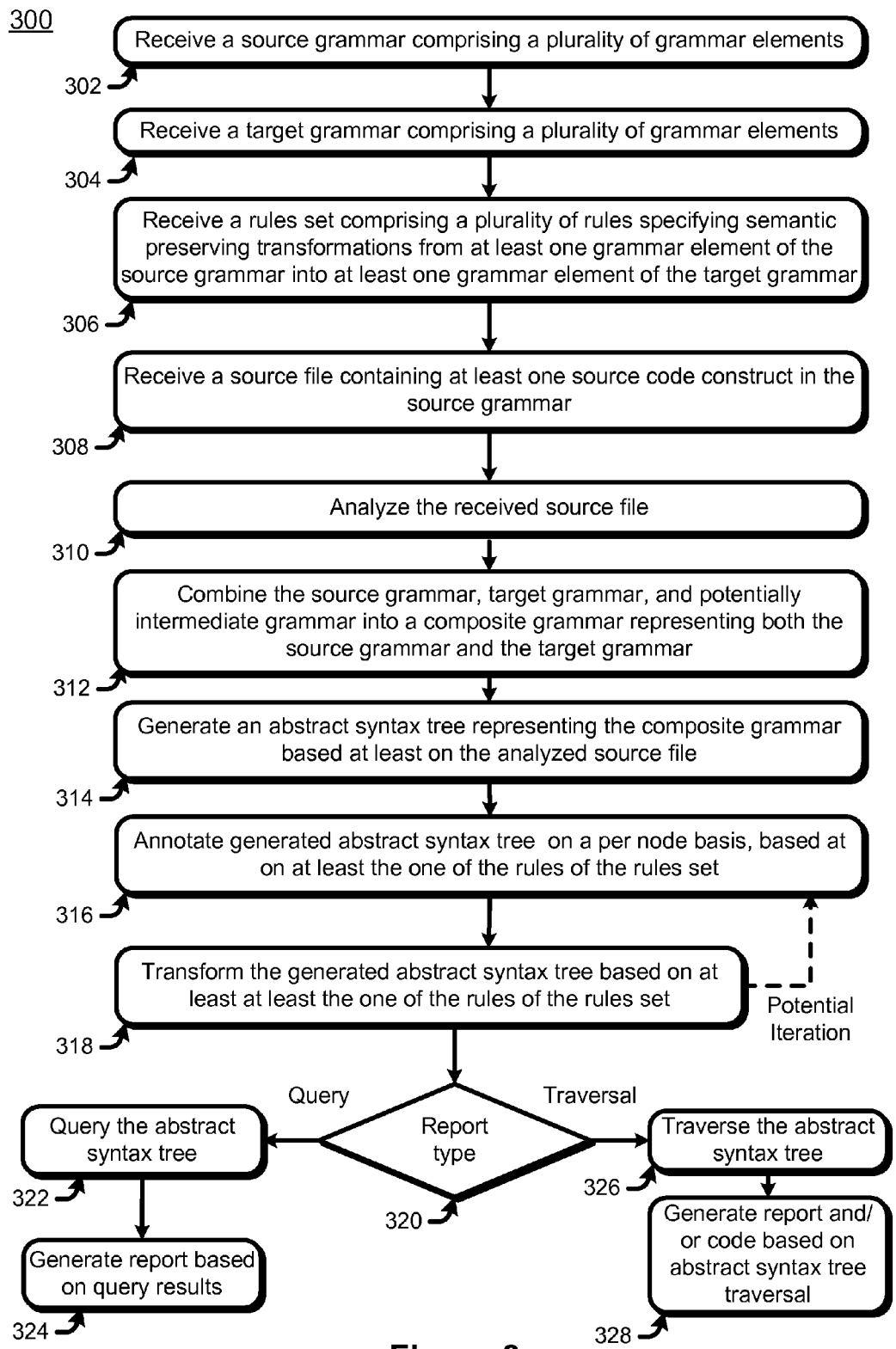
FIG. 3 is a flowchart of an exemplary operation of programming language transformations with abstract syntax tree extensions.

Example Operation of Programming Language Transformations with Abstract Syntax Tree Extensions FIG. 3 illustrates a flowchart 300 of the example operation of programming language transformations with abstract syntax tree extensions. Flowchart 300 parallels operation of system 100 with respect to FIG. 1, but expands upon the combination of grammars.

In block 302, at least one source grammar is received comprising a plurality of grammar elements and in block 304, at least one intermediate or target grammar is received comprising a plurality of grammar elements.

In block 306, a set of rules comprising a plurality of rules specifying transformations from at least one source/intermediate grammar and one intermediate/target grammar is received.

In block 308, a set of source code files containing at least one source code construct in one of the files in at least one source grammar is received.

In block 310, the source code file is analyzed. While this analysis may be used in preparation for generating the abstract syntax tree, this analysis will also be used in block 312 to determine what source code grammar constructs are to be selected. The analysis may be performed statically by parsing and/or lexing. In other embodiments, dynamic data, such as from profilers may be made use of as well. In yet other embodiments, the source code analysis may be integrated with a profiler or other run time tool to obtain dynamic, i.e., run time, data.

In block 312, the at least one source or intermediate grammar and the at least one intermediate or target grammar are combined in a composite grammar representing both the source and the target grammar. It is to be noted that source and target grammars might be intermediate, depending of the analysis, decompositions, and ensembles phases that might be required for the transformations. Therefore, source, intermediate and target grammars become composed into a single composited grammar. Furthermore, it is also to be noted that since multiple source, intermediate, and target grammars are supported, this disclosure supports grammar cardinalities of one-to-many and many-to-one. Examples are described in the following paragraphs.

An example of a many-to-one cardinality is a program with some modules written in C and others in Visual Basic™ to be ported to a program written in C#.

An example of a one-to-many cardinality is a desktop program written in C# that is to be ported into a web application with HTML5, Cascading Style Sheets (CSS), and javascript. It is to be noted that in this same example the system might need to first transform the monolithic desktop program into another C#-kind (that is with a C# AST) multi-tier program before then using another phase to transform it into the web application.

An example of a many-to-many cardinality is a C# program with inlined Structured Query Language ("SQL") being ported to a Java program accessing a No-SQL database.

Accordingly, the combination of grammars is driven not only by the grammars, but also by both what grammatical features are invoked by the source code as well as the intermediate steps required in order to separate the concerns of a complex transformation process. For example, although C++ supports generics in the form of templates, many C++ programmers choose not to use templates because of debugging difficulties. Therefore, if the source code does not make use of templates, then the composite grammar need not support generics.

The combination of grammars, including source grammars, intermediate grammars, and target grammars, may be determined either by functional equivalence at the grammatical element level, or new technical or business functionality desirability at the semantic level, including the semantics of source code constructs. In the case of functional equivalence, the input and output grammars for a transformation have elements that perform the same function in a one to one or near one to one basis perhaps using complex grammatical patterns. Accordingly, the combination of grammars is driven by syntax.

In the case of new technical or business functionality, the grammars are conjoint, that is the input and out grammars for a transformation have elements that do not have a one to one basis grammatical basis, even at the abstract level. In this case, the input abstract grammar grammatical elements and the output abstract grammatical elements are conjoint. For new technical functionality, this is most common where programming language models change such as from structural to functional programming or logical programming models. An example is porting a program from the C programming language to Lisp. For new business functionality, this may be the case when the functionality in a desktop environment need to be translated into a decoupled, intermittent, execution environment such as a mobile device accessing a web service. Thus porting is driven at the functional level and therefore at the semantic level.

Turning back to block 312 of FIG. 3, thus the combination of the source, intermediate and target grammars may include, determining which grammars are used in the code, determining syntactic features of the involved grammars supported in the code as well as the grammars in the output code, and making a set of grammar elements to be included in the composite grammar. Then the combination will determine whether the source and target grammar elements are disjoint. If they are not, then functionally equivalent target grammar elements are selected. Otherwise, the rules will be reviewed to determine what target grammar elements will be needed. Once the target grammar elements are identified, the corresponding target grammars are identified. A composite grammar then contains at least the source target grammar elements identified to be used and the intermediate and/or target grammar elements to be used. It is to be noted, that this set merely identifies a minimum grammar element set. Some or all of the other grammar elements may be included in the composite grammar as well.

In block 314, the abstract syntax tree is then generated and in block 316 is annotated according to the combined grammar and the rules, and is generated in block 318 as described in with respect to FIG. 1 above. In block 318, the transformation may be performed dynamically or conditionally. As indicated by the dotted line, blocks 316 and 318 may cycle in interactions. Dynamic and conditional generation described in further detail with respect to FIG. 4 below.

Upon completion of the transformation, in block 320, the user specifies via a user interface whether to generate an output via query or via traversing the tree. If the a query is selected, in block 322 the abstract syntax tree is queried according to a query input by the user, and a report is generated from the query results in block 324. Similarly, if a traversal is selected, the abstract syntax tree is traversed in block 326, and a corresponding report is generated in block 328. Note that one of the most common outputs based on an abstract syntax tree traversal is code generation for the target platform. Various other output reports are described in further detail with respect to FIG. 1 above.

Example Dynamic and Conditional Transformations

Figure 4:
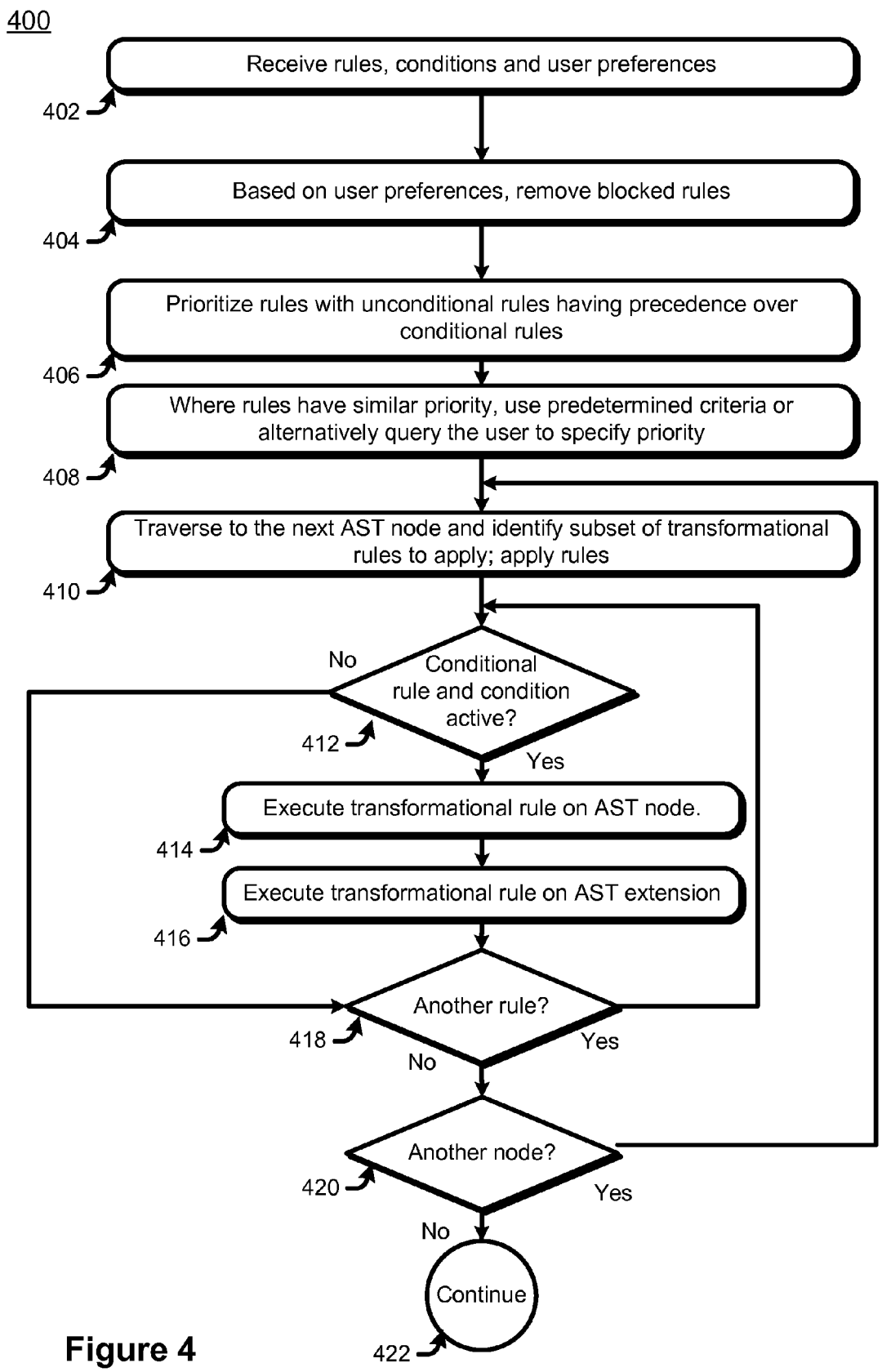
FIG. 4 is a flowchart of an exemplary operation of dynamic and conditional programming language transformations with abstract syntax tree extensions.

FIG. 4 illustrates a flowchart of an exemplary operation of dynamic and conditional transformations.

In block 402, transformational rules, conditions, and user preferences are received. The transformational rules will be removed and potentially can be prioritized based on the conditions and user preferences. Accordingly, the transformational rules are placed in a priority list and applied according to this priority and the corresponding contexts.

In block 404, transformational rules that are blocked by user are removed from the priority list. Since the transformational rule is removed, the any conditions applying to the rule will never be invoked for that rule. In this way, the user preferences override conditions on transformational rules.

In block 406, the rules are then prioritized by giving rules without conditions precedence over rules with conditions. The user preferences may also specify which rules have precedence over other rules. Thus the priority list at this stage should have the rules in priority order.

It is possible that some rules will have the same priority. In block 408, rules may be given precedence based on predetermined criteria such as user preferences, or alternatively the user technician is queried to specify which rules are to be given precedence. The criteria or user input in block 408 may then be incorporated into the user preferences if so specified by the user. If the user does not specify precedence, then rules with the same precedence will be executed sequentially in the order they happen to be in the priority list.

Transformation begins in block 410. The AST may be traversed in inner most, outer most, or in other orders. An initial AST node is identified and the subset of transformational rules to apply is identified. Some rules may be specific to the node being traversed. Some rules may be global. Some rules may be conditional. The rules are then applied as follows.

In particular, the highest precedence rule of the identified subset of rules that has not yet been evaluated is retrieved from the priority queue. In block 412, if the rule is conditional then it is determined whether the condition is active. If the rule is not conditional or if the rule is conditional has a condition is active, the transformational rule is executed in block 414. Otherwise, the transformational rule is not executed.

In block 414, execution of a specific rule is applied to the annotations in the abstract syntax tree node annotations in block 416 or the abstract syntax tree itself, if the transformational rule applies. In this way, not only the state of the abstract syntax tree, but also the state of the abstract syntax tree annotations can be changed according to rules. Since changes in the annotations can impact whether other conditional rules are executed, the conditional rules are in effect rendered dynamic rules as well.

After the abstract syntax tree nodes and the abstract syntax tree extensions are updated, in block 418 the rules execution process may continue on to the next available rule in the priority queue. If there is another rule, execution returns to block 412.

Otherwise traversal continues to the next node. In block 420, if there is another node, execution proceeds to block 410. Otherwise, execution proceeds on to the next stage of processing in block 422.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method to perform a software application transformation, comprising:
receiving a source grammar comprising a plurality of source grammar elements of a source application, the source grammar specifying syntactic rules governing a source programming language;
receiving a plurality of target grammars comprising a plurality of target grammar elements of a transformed application, the plurality of target grammars comprising different target grammars of multiple target programming languages, each of the plurality of target grammars specifying syntactic rules governing a corresponding target programming language;
receiving a rules set comprising a plurality of rules specifying transformations from at least one source grammar element into at least one target grammar element, wherein each rule of the rules set is configured to maximize semantic equivalence across a respective specified transformation of one or more source grammar elements of a source programming language into one or more target grammar elements of a target programming language;
receiving a source input containing at least one source code construct in the source grammar;
analyzing, using at least one processor, the received source input to determine a structure for an abstract syntax tree;
creating, using the at least one processor, a composite grammar that includes the source grammar of the source programming language and the plurality of target grammars of the multiple target programming languages;
generating, using the at least one processor, the abstract syntax tree based at least on the source input and at least a portion of the composite grammar such that, the abstract syntax tree represents at least one part of the source grammar of the source programming language, and at least one part of a first target grammar of a first target programming language and at least one part of a second target grammar of a second target programming language from the composite grammar, the first target grammar being different than the second target grammar; and
transforming, using the at least one processor, the generated abstract syntax tree based on one or more rules of the rules set.

2. The method of claim 1, wherein the source input further includes a file describing the abstract syntax tree structure, or a binary representation describing the abstract syntax tree structure.

3. The method of claim 1, wherein the composite grammar comprises grammar elements that are conjoint of one or more source grammar elements of the source grammar and one or more target grammar elements of the target grammar.

4. The method of claim 1, further comprising receiving an additional source grammar comprising a plurality of additional source grammar elements, wherein the creating includes creating the composite grammar to include the source grammar, the additional source grammar, and target grammar, and wherein the generating includes generating the abstract syntax tree to represent the at least one part of the source grammar, at least one additional part of the additional source grammar, and the at least one part of the plurality of target grammars.

5. The method of claim 1, wherein the source grammar and the plurality of target grammars are intermediate grammars in a chain of abstract syntax tree transformations progressing from an initial grammar to a final grammar, and the plurality of target grammars are syntactically sufficient to be another source grammar for a subsequent intermediate grammar in the chain.

6. The method of claim 1, wherein the analyzing includes performing a static analysis of the received source input.

7. The method of claim 1, wherein the analyzing includes performing dynamic analysis of data collected during run time while executing at least one of a source code file or a target source file of the received source input.

8. The method of claim 1, further comprising generating an output based at least on the transformed abstract syntax tree.

9. The method of claim 8, wherein the output is any one of the following:
   a pretty printing textual report of at least a portion of the transformed abstract syntax tree;
   a pretty printing graphical of the at least a portion of the transformed abstract syntax tree; and
   a database file representing the at least a portion of the transformed abstract syntax tree.

10. The method of claim 1, further comprising:
    querying the transformed abstract syntax tree to produce query results; and
    generating an output that is any one of the following: a pretty printing textual report based at least on a portion of the query results; and a pretty printing graphical report based at least on the portion of the query results.

11. A method to perform a software application transformation, comprising:
    receiving a source grammar comprising a plurality of source grammar elements of a source application, the source grammar specifying syntactic rules governing a source programming language of the source application;
    receiving a plurality of target grammars comprising a plurality of target grammar elements of a transformed application, the plurality of target grammars comprising different target grammars of multiple target programming languages, each of the plurality of target grammars specifying syntactic rules governing a corresponding target programming language of the transformed application;
    receiving a rules set comprising a plurality of rules specifying transformations from at least one source grammar element of the source grammar into at least one target grammar element of the plurality of target grammars;
    receiving a source input containing at least one source code construct in the source grammar;
    analyzing, using at least one processor, the received source input to determine a structure for an abstract syntax tree;
    creating, using the at least one processor, a composite grammar that includes at least one portion of the source grammar of the source programming language and at least one portion of the plurality of target grammars of the multiple target programming languages;
    generating, using the at least one processor, the abstract syntax tree based at least on an analysis of the source input, wherein the abstract syntax tree represents at least a portion of the composite grammar that includes the at least one portion the source grammar of the source programming language, and at least one portion of a first target grammar of a first target programming language and at least one portion of a second target grammar of a second target programming language, and contains a node having a node annotation that corresponds to a rule of the rules set, the first target grammar being different than the second target grammar; and
    transforming, using the at least one processor, the generated abstract syntax tree based on at least one rule of the rules set.

12. The method of claim 11, wherein the source input is any one of the following:
    a file describing an abstract syntax tree structure; and
    a binary representation describing an abstract syntax tree structure.

13. The method of claim 11, wherein semantic equivalence of at least one node of the abstract syntax tree is preserved across the transforming the generated abstract syntax tree based on the at least one rule of the rules set.

14. The method of claim 11, wherein at least one node of the abstract syntax tree is transformed from a programming language model to a different programming language model during the transforming the generated abstract syntax tree based on at least one rule of the rules set.

15. The method of claim 11, wherein the at least one rule of the rules set used in the transforming the abstract syntax tree is a non-grammatical rule.

16. The method of claim 11, wherein the non-grammatical rule is any one of the following:
    ensure binary compatibility of compiled source code generated from the transformed abstract syntax tree;
    minimize execution time of the compiled source code generated from the transformed abstract syntax tree;
    minimize memory footprint of the compiled source code generated from the transformed abstract syntax tree;
    ensure security best practices in the compiled source code generated from the transformed abstract syntax tree;
    minimize run time power draw of the compiled source code generated from the transformed abstract syntax tree;
    ensure the compiled source code generated from the transformed abstract syntax tree targets one or more tiers of a distributed system;
    ensure the compiled source code generated from the transformed abstract syntax tree complies with policies of an enterprise;
    ensure the compiled source code generated from the transformed abstract syntax tree complies with a specified standard;
    ensure the compiled source code generated from the transformed abstract syntax tree targets a particular multi-core processor configuration;
    ensure the compiled source code generated from the transformed abstract syntax tree targets a parallel processing platform;
    ensure the compiled source code generated from the transformed abstract syntax tree targets a collection of refactorings;
    ensure the compiled source code generated from the transformed abstract syntax tree performs a specified ontological change;
    ensure the compiled source code generated from the transformed abstract syntax tree performs an injection of missing attributes; and
    ensure the compiled source code generated from the transformed abstract syntax tree targets a specific chip configuration.

17. The method of claim 11, wherein, during the transforming the abstract syntax tree, at least two rules of the rules set are used in the transforming the abstract syntax tree, and at least one node in the abstract syntax tree has more than one potential target transformation.

18. The method of claim 11, wherein, during the transforming the abstract syntax tree, at least two rules of the rules set are used in the transforming the abstract syntax tree, and at least two nodes in the abstract syntax tree are transformed into a unique target.

19. The method of claim 11, wherein the transforming includes subjecting the at least one rule of the rules set to a condition.

20. The method of claim 19, wherein the condition is deduced during the transforming as to alter an application of the at least one rule of the rules set.

21. The method of claim 19, wherein the condition is any one of a set of:
   selection of a rule of the rules set by a user; and
   selection of a rule from a state of the abstract syntax tree.

22. The method of claim 19, wherein the condition is a selection of a rule from a state of the abstract syntax tree after applying a rule of the rules set.

23. The method of claim 19, wherein the condition is to trigger an application of a rule of the rules set, further comprising overriding the condition by a user selection.

24. A computing system to perform a programming language transformation, comprising:
   one or more processors;
   memory storing component executable by the one or more processors, the components comprising:
      an input module to receive a source grammar of a source application comprising a plurality of source grammar elements, the source grammar specifying syntactic rules governing a source programming language, to receive a plurality of target grammars of a transformed application comprising a plurality of target grammar elements of multiple target programming languages, each of the plurality of target grammars specifying syntactic rules governing a corresponding target programming language, the plurality of target grammars comprising different target grammars, and to receive a source input containing at least one source code construct in the source grammar;
      a rules set comprising a plurality of rules specifying transformations from at least one source grammar element of the source grammar into at least one target grammar element of the target grammar, wherein each rule of the rules set is configured to maximize semantic equivalence across a respective specified transformation;
      a grammar compositor to combine the source grammar of the source programming language and the plurality of target grammars of the multiple target programming languages into a composite grammar;
   a source code analyzer to analyze the source input containing the at least one source code construct in the source grammar to determine a structure for an abstract syntax tree;
      an abstract syntax tree generator to generate the abstract syntax tree, the abstract syntax tree being generated based at least on the analyzed source input and containing a node having a node annotation that corresponds to a rule of the rules set, wherein the abstract syntax tree represents at least a portion of the composite grammar including at least a portion of the source grammar of the source programming language, and at least a portion of a first target grammar of a first target programming language and at least a portion of a second target grammar of a second target programming language, the first target grammar being different than the second target grammar;
      an abstract syntax tree transformer to transform the generated abstract syntax tree based on the at least one rule of the rules set; and
      an output module to query the abstract syntax tree and generate a report based at least on query results of the query.

* * * * *